May 22, 1934. G. H. MAINS 1,959,762
METHOD OF PRODUCING MOLDED LAMINATED MATERIAL
Filed Dec. 27, 1930
Fig. 1.
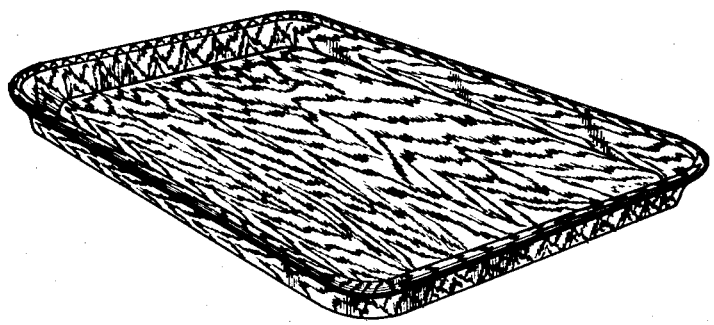
Fig. 2.
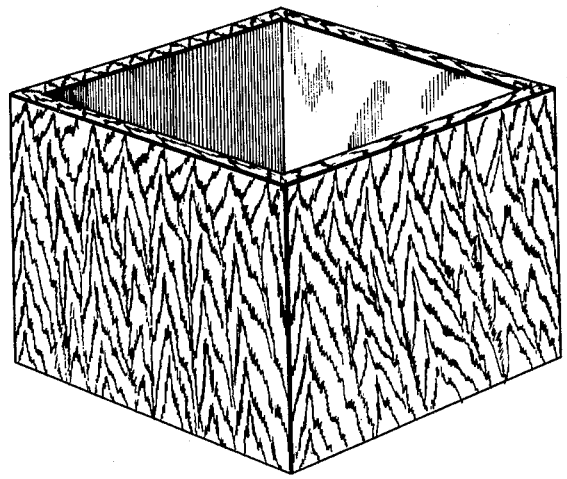
Fig. 3.
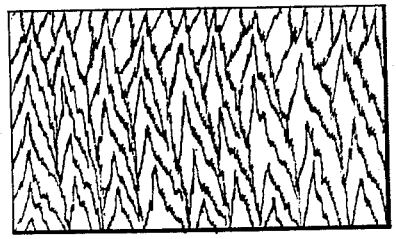
Fig. 4.
WITNESSES
INVENTOR
Gerald H. Mains
ATTORNEY Patented May 22, 1934

1,959,762

UNITED STATES PATENT OFFICE 1,959,762

METHOD OF PRODUCING MOLDED LAMINATED MATERIAL

Gerald H. Mains, Murrysville, Pa., assignor to Westinghouse Electric & Manufacturing Company, a corporation of Pennsylvania Application December 27, 1930, Serial No. 505,190

5 Claims. (Cl. 154—2)

My invention relates to flexible laminated materials and to methods of producing the same.

An object of my invention is to provide a process of producing laminated articles having an outer surface of wood veneer which comprises impregnating a flexible sheet of the veneer having cemented thereto a strengthening sheet of a suitable fabric, such as cloth, with a binding agent capable of being hardened under heat and pressure, such as a phenolic condensation product, and utilizing the impregnated composite sheet as an outer surface layer in preparing a laminated material or a molded article.

A still further object of my invention is to provide a process for producing a composite molded laminated article which comprises impregnating a flexible layer of wood veneer having a layer of fibrous material cemented thereto, with a solution of a suitable varnish, assembling the impregnated sheet or sheets of wood-veneer upon one or both surfaces of a plurality of sheets of impregnated material, and then molding the assembled material, under heat and pressure, to form the final product.

And a still further object of my invention is to provide a molded product having a definite resin and volatile content and a flexible wood veneer surface.

In producing composite laminated articles having a wood-veneer surface sheets and a body of fibrous material bound together by a suitable binding agent, such as a phenolic condensation product, it has heretofore been the practice to utilize individual sheets of wood-veneer having a thickness of 1/28 to 1/32 of an inch for the surface sheets. In preparing the wood veneer for molding, it was necessary to impregnate the sheets individually, or in groups, thus making it difficult to control the impregnating operation and causing the drying operation to be slow and unsatisfactory because of the fragility and inflexibility of the material which rendered it hard to handle and difficult to support during the drying process.

The foregoing method of impregnating the wood veneer was also unsatisfactory because only narrow strips of wood veneer or wider rotary-cut strips were available. Wood veneer, in such forms, is difficult to handle and it is impracticable to impregnate it in a resinous solution by a continuous operation. Labor and operating costs are high, and it is difficult to obtain uniform impregnation and to control the resin and the volatile content of the finished product.

I have made the discovery that thin flexible sheets or strips of wood veneer, having an adherent supporting layer of paper or cloth, may be impregnated or coated with a suitable binding agent in a continuous operation, and dried without breaking or cracking. The treated wood veneer, thus formed, may then be satisfactorily employed as the surfacing material upon a body of material comprising a plurality of sheets of fibrous material, impregnated with a binding agent, and the assembled structure molded, under heat and pressure, to form a composite article.

My invention is illustrated by the accompanying drawing, in which:

Figure 1 is a perspective view of a tray having an outer surface comprising a continuous sheet of wood veneer;

Fig. 2 is an isometric view of a container having an outer surface comprising wood veneer;

Fig. 3 is a plan view of a sheet of wood veneer, and

Fig. 4 is a cross-sectional view of the sheet shown in Fig. 3.

In practicing my invention, fibrous material, such as paper or cloth, is adhesively applied to relatively thin sheets of wood veneer by any suitable adhesive, such as glue, casein solutions, blood albumen or solutions of sodium silicate. The adhesive employed for this purpose must be relatively insoluble in organic solvents, such as alcohol or benzol, and should be stable at the high temperatures utilized in the molding operation. The flexible cloth or paper-backed wood veneer is then preferably passed, in a continuous manner, through suitable receptacles, such as treating vats, containing a solution of the impregnating medium. The nature of the impregnating medium employed will depend upon the character of the product desired and upon the type of impregnating apparatus utilized. Solutions of a phenolic condensation product, urea or thiourea resins or a mixture thereof, vinyl acetate, or reaction products comprising polyhydric alcohols and polybasic acids may be employed, or a melted resin may be utilized when it is desired to obtain a superficial coating upon the wood veneer. For example, the cloth or paper-back wood veneer may be passed through an alcoholic solution or a benzol-alcohol solution of phenol-formaldehyde resin, containing from 10 per cent to 50 per cent resin, by weight, or an aqueous solution of urea or thiourea aldehyde resin or a mixture thereof, containing from 10 per cent to 50 per cent, by weight, of the resin, together with a small quantity of a suitable plasticizing agent, such as butyl phthalate, diethyl-phthalate, para toluene, ethyl sulphonomide, or ortho toluene ethyl or methyl sulphonomides, or camphor. It will, of course, be understood that the above examples are merely illustrative, as solutions of resins or binding agents of various types may be employed or the resin may be liquefied by heating and utilized without placing it in solution. If desired, the impregnated material may then be passed through squeezer rolls which are so spaced in relation to each other as to remove excess resinous solution from the treated material and provide a uniform coating thereon. This latter method is particularly advantageous when it is desired to provide material having a heavier resin content upon one surface than upon the other.

The time required for the impregnation depends upon the thickness of the material, the viscosity of the resinous solution, the rate at which the material is passed through the impregnating medium and the temperature of the resinous solution, as faster impregnation may be obtained by utilizing higher temperatures. As a general rule, a speed of from 30 to 200 inches per minute and temperatures varying from 50° C. to 150° C. provide satisfactory results.

The impregnated wood veneer, after passing through the squeezer rolls, is passed through a suitable drying oven, such as a vertical drying tower or a horizontal drying oven, which is maintained at a temperature of 50° C. to 150° C. by a heating medium circulated in suitable coils. The drying of the impregnated wood veneer may be accelerated by blowing air through the drying oven at a rate of 2000 to 4000 cubic feet per minute. It is advantageous to determine the volatile content of the treated material at this stage of the process in order to provide material having a definite volatile content, so as to obtain the desired degree of plasticity and to prevent the material adhering to the molding plates during a subsequent molding operation. This determination comprises removing a definite quantity of the impregnated material and weighing the same before and after a drying operation, the resulting loss of weight representing the volatile content of the material.

The dried treated material thus produced may be placed upon one or both surfaces of a plurality of sheets which have been impregnated with a binding agent, such as paper, cloth, wood, shredded asbestos or shredded or chopped duck, other wood veneer or wood, the assembled material placed in a mold and subjected to a hydraulic pressure of from 600 to 3000 pounds per square inch, at a temperature of from 100° C. to 200° C. for a period of time dependent upon the thickness of the material being molded and the resin content, the type of resin employed and the condition of the resin in the treated material. These treated sheets of wood veneer may also be employed as the surfacing material upon unimpregnated body material, such as ply wood, or composition building boards, by molding the single sheets of wood veneer, under the above described conditions, and then gluing or cementing the molded sheets of wood veneer to one or both surfaces of the body material. The treated wood veneer sheets may also be directly molded to wood, asbestos board and other types of solid non-impregnated body material.

A high degree of impregnation is obtained by repeatedly passing the wood veneer through comparatively dilute solutions of the resin, while a lower degree of impregnation is obtained by passing it through a more concentrated solution. The resin content of the impregnated wood veneer may be controlled by varying the concentration of the impregnating medium, and the number of times the material is passed through it. For example, three passes through a solution containing 10 per cent, by weight, of resin, produce a material having a high degree of saturation and a fairly high resin content which is unaffected by water and is resistant to the action of weak acid and alkaline solutions. A less thoroughly impregnated wood veneer, having a lower resin content and having a higher tensile strength, after molding, is produced by passing the material once through a solution containing 30 per cent to 50 per cent resin, by weight.

The volatile content of the impregnated wood veneer may be regulated, as desired, by varying the speed of the impregnation, the temperature of the drying oven, the concentration of the impregnating medium, the distance between the coating rolls and the volume of air passed through the drying oven, or by various combinations of all or a part of these factors.

The volatile content of the wood veneer may vary from .5 per cent to 12 per cent, by weight, depending upon the type of resin employed as the impregnating medium and upon the subsequent treatment of the wood veneer. If a phenolic condensation product is utilized as a binding agent, and a light color is desired in the finished molded product, the molding operation should be conducted at a relatively low temperature. A low volatile content is desirable in molding plates under any molding conditions, while a higher volatile content from 6% to 10% is advantageous for the molding of small articles other than plates in order to produce a satisfactory surface over the entire molded article. When the wood veneer is impregnated with a urea or thiourea resin, or a mixture of the two, and is utilized in plate material which is not subjected to a high molding temperature and pressure, it should have a volatile content of about 4 to 8 per cent, by weight, or, if it is desired to utilize wood veneer impregnated with this medium for molding articles of complicated form, the volatile content should be slightly higher, say, approximately 6 per cent to 12 per cent, by weight.

While I have stated that the temperatures employed during the molding operation may vary from 100° C. to 200° C., I prefer to utilize temperatures ranging from 145° to 200° C. in the molding of wood veneer impregnated with phenolic resins. Material impregnated with urea-thiourea resins is preferably molded at temperatures of from 100° C. to 150° C. The molding pressures employed by my improved method will also vary according to the type of product desired. A pressure of 1000 to 1500 pounds per square inch is adequate for the molding of large flat pieces, while a pressure of 1500 to 2500 pounds per square inch is required for small molded articles.

Sheets of impregnated wood veneer may be provided by my improved method having a coating of resin on one or both sides, or a heavier coating may be provided on one side than is provided on the other. When it is desired to provide a coating on one side, the wood veneer is passed between rolls, one of which carries the resinous solution. Heavier coating may be provided on one side than on the other by first passing the wood veneer, either once or repeatedly, through a solution of the resin, each pass being followed by a partial drying operation, and then passing it between rolls, one of which carries a solution of resin, or a melted resin itself. The latter method is preferred when it is desired to provide sheet material for decorative purposes, as, in such case, it is necessary to have a high resin content on one side.

My process is also applicable for producing molded tubes. In such cases, sheets may be coated on one or on both sides with a resinous solution, as specified above, and rolled into the form of a tube. The tube may then be placed on a suitable mandrel and molded in a tubular mold under temperature and pressure conditons as described above for plate material. Where an attractive surface is not as essential, the wood veneer may be passed over a heated roll, then rolled between heated pressure rolls upon a heated mandrel. The tube thus formed is then baked in an oven from 2 to 6 hours at a temperature of 100° C. to 150° C., and finally stripped from the mandrel.

It is desirable to utilize a material having substantial strength, such as cloth, as the supporting adherent layer for wood veneer when the material is to be subsequently subjected to high molding pressures. However, paper backing furnishes sufficient strength to wood veneer to withstand ordinary handling if the material is not molded under high pressure or subjected to rough handling.

Colored wood veneer or stained wood veneer may be produced by incorporating suitable dyes or stains in the impregnating medium, or the wood veneer may be first dyed or stained and then impregnated with the resinous solution. Any of the alcohol-soluble aniline derivatives, such as black nigrosine or Congo red or water-soluble wood stains, such as Adam brown or wood brown, may be utilized for such purposes.

By my improved method, a thin flexible wood veneer may be utilized which is less expensive than the thicker sheets previously utilized, thus enabling a considerable reduction in expense to be effected. Furthermore, by utilizing a thin flexible sheet, the process of impregnating and drying is more uniform and may be rendered continuous, thereby providing a better product and materially reducing the treating and handling costs. Thin flexible sheets of impregnated wood veneer are produced by my improved method which are entirely suitable for the production of rods, tubes and practically all complicated molded forms.

Although I have described my invention more particularly with respect to plates and tubes, it will, of course, be understood that it may be utilized for various structures, such as rods, trays, meter cases and clock cases. It is particularly applicable for the latter structures because the reinforced wood veneer which I utilize is flexible, and, therefore, may be utilized in structures having irregular surfaces. Insofar as I am aware, it has heretofore been impracticable to utilize wood veneer except as a surface sheet in such articles when it has been cut into small pieces, and I, therefore, desire to claim such articles specifically. For example, in making trays, such as are described in the copending application of Noble S. Clay, Serial No. 278,513, filed May 17, 1928, which is assigned to the Westinghouse Electric and Manufacturing Company, flexible wood veneer, impregnated with a suitable resin, may be utilized as the outer sheet and molded in the same manner as if the sheet were made of paper or cloth. In the same manner, it may be utilized as the outer sheet in the formation of containers, meter boxes and the like, such as are disclosed in Patent No. 1,599,524. It may also be utilized as the outer sheets in clock cases and various other articles having an intricate shape.

The reinforced impregnated wood veneer may be utilized in applications such as tubes, but, in most applications, it will be utilized as surface sheets on molded structures in which the bodies may be formed of other fibrous sheet material or the body portions may be formed of a filler, such as wood flour or chopped or shredded pieces of cloth or fibrous material impregnated with a resin.

While I have disclosed my invention in considerable detail and have given specific examples, it will be understood that the examples are to be construed as illustrative and not by way of limitation. For example, I do not desire to restrict my invention to the utilization of synthetic resins as the impregnating medium, as ordinary varnishes or shellac may be employed when molding is not required.

Other modifications which will be apparent to those skilled in the art may be effected without departing from the spirit or scope of my invention. I desire, therefore, that only such limitations shall be imposed as are indicated in the appended claims.

I claim as my invention:

1. A process of forming a pliable sheet of moldable wood-veneer adapted to be applied to irregular surfaces, comprising treating thin wood-veneer that is in the form of a flexible sheet having a fibrous supporting backing by impregnating the entire sheet with a solution of heat-hardening resin, and eliminating surplus resin and then drying the sheet to a volatile content of about 0.5 to 12%.

2. A process of forming a pliable sheet of moldable wood-veneer adapted to be applied to irregular surfaces, comprising treating thin wood-veneer that is in the form of a flexible sheet having a fibrous supporting backing by impregnating the entire sheet with about 10 to 50% solution of heat-hardening resin, drying the sheet, repeating the impregnation treatment applying a final coating of resin to the veneer surface only for increase of its resin content relatively to the backing, and finally drying the sheet to a volatile content of about 4 to 12% to leave the wood fibres intact but pliable.

3. A process of forming a pliable sheet of moldable wood-veneer adapted to improve the veneering of irregular surfaces, comprising treating thin wood-veneer that is in the form of a flexible sheet having a fibrous supporting backing by impregnating the veneer with 10 to 50% aqueous solution of a urea resin, eliminating a surplus resin and then drying the sheet to a volatile content of about 4 to 12% to leave the wood fibres intact but pliable, and then conforming the sheet to the surface to be covered by molding at temperatures of about 100 to 150° C. under pressure of about 1000 to 2500 pounds per square inch.

4. A process of covering surfaces with wood-veneer adapted to conform to irregular surfaces, comprising treating thin wood-veneer that is in the form of a flexible sheet having a fibrous supporting backing by impregnating the entire sheet with 10 to 50% solution of heat-hardening resin, eliminating surplus resin and then drying the sheet to a volatile content of about 4 to 12% to leave the wood fibres intact but pliable, and then conforming the sheet to the surface to be covered by molding at temperatures of about 100 to 200° C. under pressure of 600 to 3000 pounds per square inch.

5. A process of covering surfaces with wood-veneer adapted to conform to irregular surfaces, comprising treating thin wood-veneer that is in the form of a flexible sheet having a fibrous supporting backing by impregnating the entire sheet with 30 to 50% solution of heat-hardening resin, eliminating surplus resin and then drying the sheet to a volatile content of about 6 to 12% to leave the wood fibres intact but pliable, and then conforming the sheet to an irregular surface to be covered by providing the surface with heat-hardening resin and molding at temperatures of about 100 to 200° C. under pressure of 1500 to 2500 pounds per square inch.

GERALD H. MAINS.